(12) United States Patent
Iizumi et al.

(10) Patent No.: US 11,275,217 B2
(45) Date of Patent: Mar. 15, 2022

(54) FIELD INSTALLABLE FIBER OPTIC CONNECTOR WITH CRIMP ZONES FOR UNJACKETED OPTICAL FIBERS

(71) Applicant: Senko Advanced Components, Inc., Marlborough, MA (US)

(72) Inventors: Kenji Iizumi, Tokyo (JP); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/912,591

(22) Filed: Jun. 25, 2020

(65) Prior Publication Data

US 2020/0408998 A1    Dec. 31, 2020

Related U.S. Application Data

(60) Provisional application No. 62/971,350, filed on Feb. 7, 2020, provisional application No. 62/866,958, filed on Jun. 26, 2019.

(51) Int. Cl.
*G02B 6/38* (2006.01)

(52) U.S. Cl.
CPC ......... *G02B 6/3857* (2013.01); *G02B 6/3869* (2013.01); *G02B 6/3887* (2013.01)

(58) Field of Classification Search
CPC ................ G02B 6/3857; G02B 6/3869; G02B 6/3887; G02B 6/406
See application file for complete search history.

(56) References Cited

U.S. PATENT DOCUMENTS

| | | | | |
|---|---|---|---|---|
| 4,969,924 A * | 11/1990 | Suverison | ............ | G02B 6/3817 385/78 |
| 5,622,394 A * | 4/1997 | Soles | .................. | F16L 33/2076 285/256 |
| 6,579,014 B2 | 6/2003 | Melton et al. | | |
| 7,585,116 B2 | 9/2009 | Cull et al. | | |
| RE41,743 E * | 9/2010 | Naudin | ................ | H02G 15/007 385/100 |
| 8,636,425 B2 * | 1/2014 | Nhep | ................... | G02B 6/3861 385/81 |
| 8,876,407 B2 * | 11/2014 | Grinderslev | ......... | G02B 6/3887 385/86 |
| 9,122,009 B1 * | 9/2015 | Griffin | ................. | G02B 6/3813 |
| 9,151,904 B2 * | 10/2015 | Nhep | ................... | G02B 6/3887 |
| 9,223,089 B1 * | 12/2015 | Griffin | ............. | H01S 3/094003 |

(Continued)

FOREIGN PATENT DOCUMENTS

EP    2857878 A1    4/2015

OTHER PUBLICATIONS

International Search Report and Written Opinion; Application No. PCT/US19/45705, dated Dec. 11, 2019, pp. 11.

(Continued)

*Primary Examiner* — Andrew Jordan

(57) ABSTRACT

A field installable fiber optic connector is formed without the need to splice two opposing optical fibers together. A ferrule flange assembly with one or more crimp zones secures an optical fiber therein. The assembly is secured within a plug frame housing that has a bias spring, both secured therein by an extender cap. A cable retainer with at least two wings secures the optical cable when a retainer nut is screwed onto a backpost of the extender cap.

11 Claims, 18 Drawing Sheets

(56) References Cited

U.S. PATENT DOCUMENTS

| | | | | |
|---|---|---|---|---|
| 9,500,813 B2* | 11/2016 | Nhep | .................... | G02B 6/3821 |
| 9,618,703 B2* | 4/2017 | Iizumi | .................. | G02B 6/3857 |
| 9,841,566 B2* | 12/2017 | Nhep | .................... | G02B 6/3887 |
| 9,989,711 B2* | 6/2018 | Ott | ........................ | G02B 6/3823 |
| 10,146,011 B2* | 12/2018 | Nhep | .................... | G02B 6/3821 |
| 10,495,822 B2* | 12/2019 | Nhep | ..................... | G02B 6/381 |
| 10,859,771 B2* | 12/2020 | Nhep | .................... | G02B 6/3821 |
| 2005/0147359 A1* | 7/2005 | Sato | ..................... | G02B 6/3861 |
| | | | | 385/80 |
| 2012/0257859 A1* | 10/2012 | Nhep | .................. | G02B 6/38875 |
| | | | | 385/81 |
| 2012/0301085 A1* | 11/2012 | Grinderslev | ......... | G02B 6/3887 |
| | | | | 385/77 |
| 2013/0094821 A1 | 4/2013 | Logan | | |
| 2013/0121648 A1* | 5/2013 | Hung | .................... | H01R 24/58 |
| | | | | 385/79 |
| 2014/0254988 A1* | 9/2014 | Nhep | .................... | G02B 6/3825 |
| | | | | 385/78 |
| 2015/0098681 A1* | 4/2015 | Iizumi | .................. | G02B 6/3857 |
| | | | | 385/92 |
| 2016/0131857 A1 | 5/2016 | Goncalves et al. | | |
| 2016/0178850 A1* | 6/2016 | Nhep | ..................... | G02B 6/387 |
| | | | | 385/80 |
| 2017/0059783 A1 | 3/2017 | Kenji et al. | | |
| 2017/0168245 A1* | 6/2017 | Nhep | ..................... | G02B 6/3888 |
| 2017/0212313 A1* | 7/2017 | Elenabaas | ............ | G02B 6/3869 |
| 2017/0212314 A1* | 7/2017 | Iizumi | .................. | G02B 6/3865 |
| 2019/0162911 A1* | 5/2019 | Nhep | .................... | G02B 6/3823 |
| 2019/0302374 A1 | 10/2019 | Lee et al. | | |
| 2019/0310430 A1* | 10/2019 | Nguyen | .................... | G02B 6/36 |
| 2020/0049903 A1 | 2/2020 | Okada et al. | | |
| 2020/0166712 A1* | 5/2020 | Nhep | ..................... | G02B 6/387 |
| 2020/0408998 A1* | 12/2020 | Iizumi | .................. | G02B 6/3869 |

OTHER PUBLICATIONS

International Search Report and Written Opinion for PCT Application No. PCT/US2020/039697, dated Dec. 2, 2020.

* cited by examiner

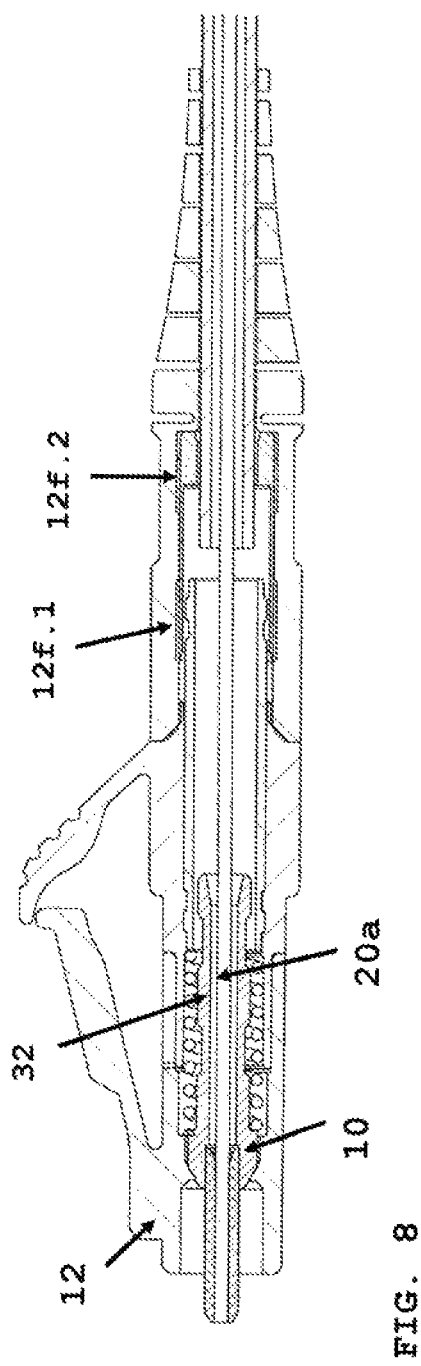

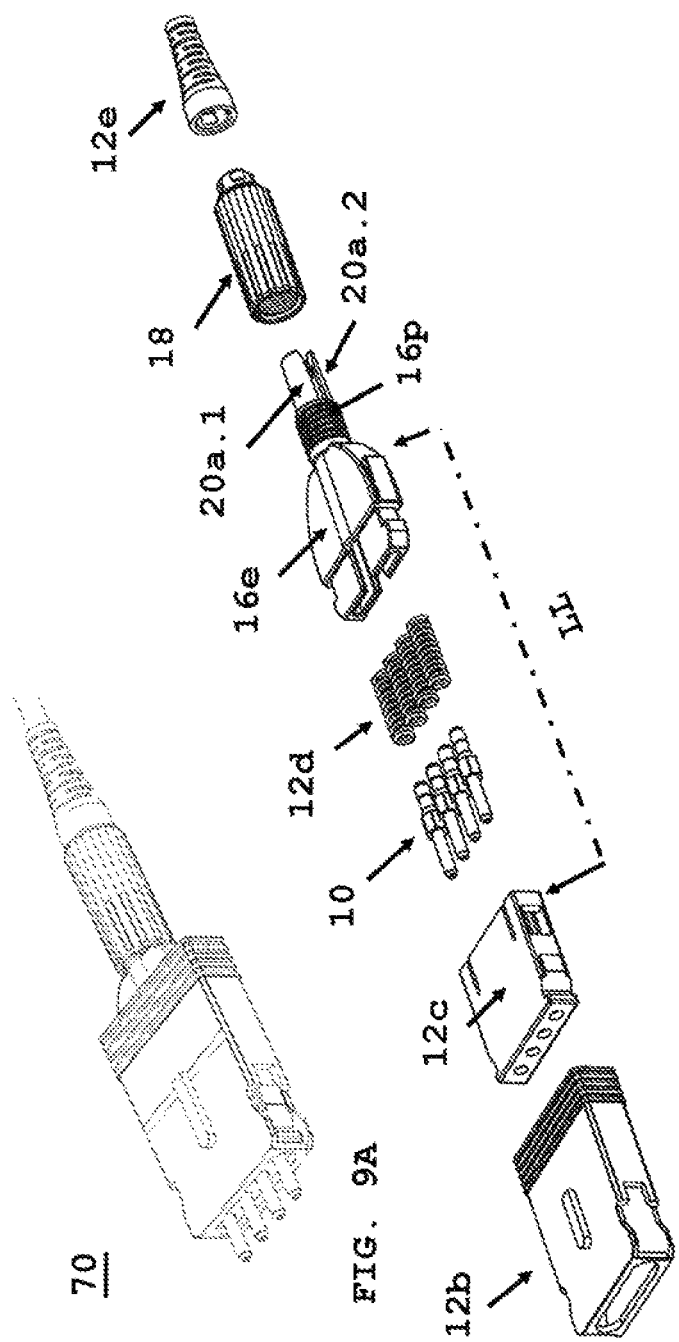

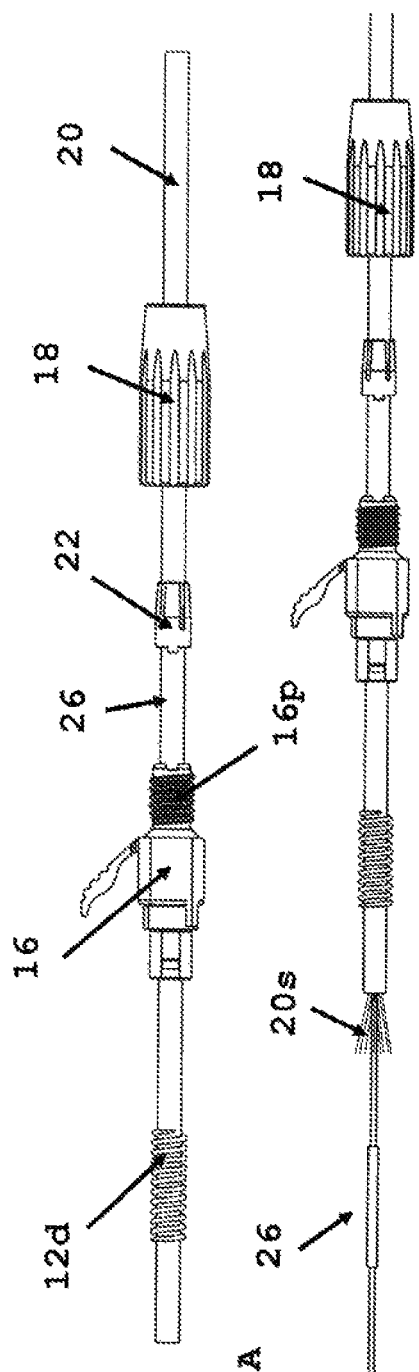

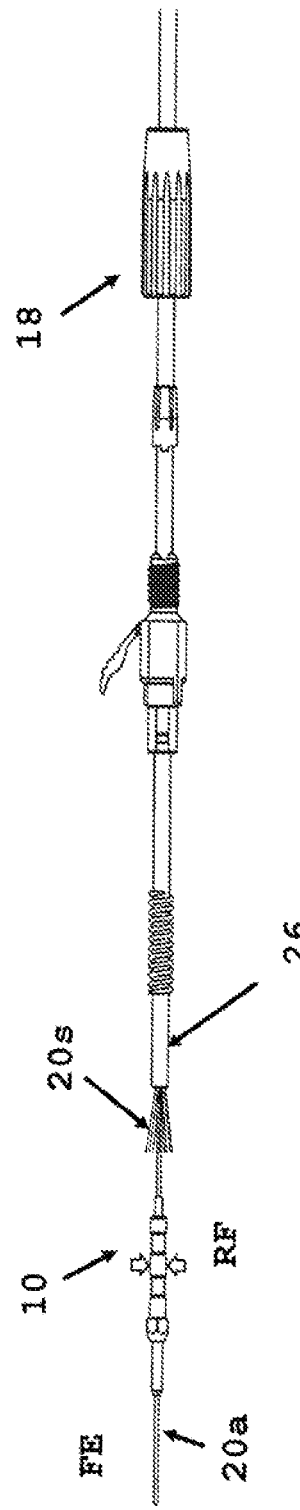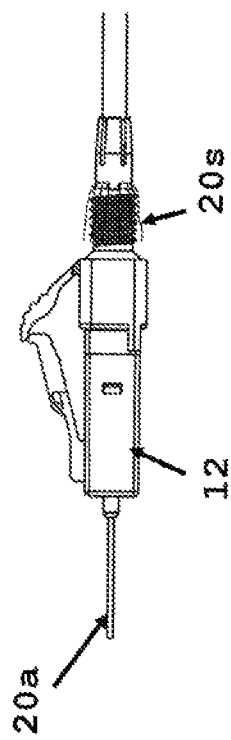
FIG. 15C
FIG. 15D

FIELD INSTALLABLE FIBER OPTIC CONNECTOR WITH CRIMP ZONES FOR UNJACKETED OPTICAL FIBERS

CROSS REFERENCE TO RELATED APPLICATIONS

This application claims priority to U.S. Provisional Patent application No. 62/866,958 filed Jun. 26, 2019 and U.S. Provisional Patent Application No. 62/971,350 filed Feb. 7, 2020 and both patent applications are fully incorporated by reference.

FIELD OF THE INVENTION

The present disclosure relates generally to field installable fiber optic connectors and systems, and more specifically connecting a fiber optic cable to a fiber optic connector with an optical fiber in the field using a ferrule assembly with one or more crimp zones, and further securing the fiber optic cable components with different fiber optic connector components to form a fiber optic connector assembly.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Over-stressing the cables and connectors may produce latent defects, compromise the integrity and/or reliability of the terminations, and potentially cause serious disruptions to network performance. So when constructing a fiber optic connector and attaching it to an optical fiber within an incoming fiber optic cable, the connector must have a large pull strength, usually greater than 200 Newtons. The pull strength is typically measured by how much force can be applied to the incoming cable without damaging the fiber optic connector.

Fiber optic connectors assembled are assembled within a factory called factory terminated. A long felt need are fiber optic connectors that can be assembled in the field or a field installable connector. Assembly in the field or outside a factory setting introduces difficulty for the user. The user does not have access to equipment that can construct the fiber optic connector and secure the fiber optic cable in a repeatable manner. Failure of a fiber optic connector typically occurs between the optical fiber of the ferrule and the optical fiber of the incoming optical cable. A ferrule assembly is secured within a plug housing or connector body after the optical fiber in the optical cable is secured to the optical fiber of the ferrule assembly. The optical cable needs to have a sufficient pull strength to ensure the optical fiber therein does not separate from the ferrule optical fiber. The latter is sometimes referred to as a pigtail fiber.

An optical fiber is typically glass. A fiber optic glass cable has an outer jacket, inner strength or reinforcing fibers and a covering or sheath about the optical glass. When forming a fiber optical connector assembly, the optical cable components are stripped and pulled back. The glass fiber is cleaved, inserted into a ferrule assembly and polished. The glass fiber is polished at a proximal end of the ferrule to form an endface. Ferrule assembly is inserted into a connector housing and secured therein. The distal end of the fiber cable is secured with a crimp ring and a crimp boot. Given the small size of these components, a field installer is challenged to ensure the cable is secure to the connector components to establish the necessary pull strength in the field, and the optical fibers are aligned or face-to-face, which is a blind operation. Optical fiber made out of glass is delicate to use and subject to breakage or cracks being formed when handled in the field. A factory terminated fiber optic connector uses expensive and technically complicated fusion splicers to ensure repeatability.

In the prior art, optical splicing is a common technique to create a fiber optic connector assembly. U.S. Pat. No. 9,360,624B2 issued to Corning Optical Communications and titled "Splice Protection For Fiber Optic Ribbons", discloses a splicing a ribbon fiber optic cable to a connector. The patent demonstrates special equipment needed to ensure alignment of optical fibers before fusion splicing. A second U.S. Pat. No. 7,371,020B2 issued to Fujikura Ltd, of Tokyo, JP, titled "Method of Aligning Optical-Fibers, Optical-Fiber Alignment Device, and Optical-Fiber Fusion Splicer", discloses an optical fusion splicer that further demonstrates the high cost of factory terminated fiber optic connector assemblies. The cost is the equipment, and the skilled worker operating the equipment for securing the optical fiber in the fiber cable to the optical fiber within the ferrule assembly.

As connectors reduce in size, there needs to bean easy and efficient way to splice together a ferrule assembly pigtail with an optical cable in the field in a repeatable manner to ensure a high success rate of building a fiber optic connector and/or fiber optic connector assembly.

SUMMARY OF THE INVENTION

The present invention reduces field installation time when an optical fiber, made of glass or a polymer optic fiber (called a POF fiber) is inserted into a ferrule flange assembly and secured therein when the installer applies a radial force at one or more crimp zones along the ferrule flange assembly. This is a substantial time savings.

In a first embodiment a ferrule flange assembly has a longitudinal bore with a ferrule and an optical fiber therein secured to a first end of the ferrule flange assembly, and a second optical fiber is passed through a second end or opposite end until the fiber abuts an optical fiber within the ferrule. Alternatively, the ferrule may not be provided with an optical fiber within its bore, and the installer can insert the optical fiber within the ferrule bore until the optical fiber is accessible at a ferrule endface to establish a communication path with an opposing ferrule.

The ferrule assembly further comprises a flange at the first end, and a main body extending toward the second end. The ferrule flange secures the ferrule flange assembly within a connector housing or plug frame. The ferrule flange can be configured as a crimp zone. When a radial force is imparted about the ferrule flange, flange is collapsed about the second optical fiber to secure the fiber within the ferrule assembly. The radial force is sometimes called crimping in the art. The optical cable comprises an outer jacket and between the outer jacket and optical fiber are strength members. An installer would cleave or cut the optical cable, or strip the optical cable jacket and pull back the strength members partly exposing a short length of optical fiber that is sufficient in length to be pushed through the ferrule assembly bore and abut the optical fiber provided by the ferrule assembly, or extend beyond the ferrule endface. The optical fiber is then cleaved and polished to form the ferrule endface.

In another embodiment, in addition to the ferrule flange being configured as a crimp zone, the ferrule assembly main body may be configured with one or more crimp zones. A crimp zone may extend the full length of the main body. A crimp zone may be a rib spaced along the main body. A crimp zone may be formed by scoring the outer surface of the main body creating multiple sections or crimp zones that an installer can apply a radial force "RF" to further secure the optical cable optical fiber within the bore of the ferrule assembly. A protective tubing may be provided about the optical fiber and is positioned beneath the crimp zone before the crimp force is applied to further protect the optical fiber from breakage or cracking. Any cracks cause the light signal to become distorted which leads to information loss. The small diameter the optical fiber the more likely a protective tubing is used.

In another embodiment, a method of field installing or creating a fiber optic connector is disclosed. A ferrule assembly with or without an optical fiber therein is inserted into the ferrule assembly and crimped as described above. Prior to securing the incoming optical cable to the ferrule assembly, a bias spring is inserted about the optical cable or fiber. An extender cap with an external release latch is secured to the plug housing that accepts and secures the ferrule flange assembly therein. The spring ensures there is a distal force applied to the ferrule assembly to ensure the endface of the ferrule mates or is opposite a second fiber optic connector ferrule assembly to form a communication pathway. The stripped optical cable jacket and strength members are secured with other connector components to increase pull strength on the optical cable during use. Depending on the outer diameter of the optical fiber a spacer may be used about the fiber to help center the fiber and ensure the crimp zone makes contact with the optical fiber.

Pull strength should be greater than 400 Newtons depending on the optical cable deployed, such as a round cable or flat cable. To achieve pull strength requirements, an extender cap with a threaded backpost receives the strength members about the threads prior to attaching a retaining nut by threading the retainer nut onto the threaded backpost. The strength members are caught between the threads of the backpost and retainer nut, which increases the pull strength of the optical cable. Additionally, a cable retainer may be positioned on the backpost. The cable retainer has two frustoconical wings separated by a gap or slot. The retainer nut compresses the wings over the cable jacket when the retainer nut is threaded onto the backpost. To further protect against excess pulling or stress on the optical cable, the optical fiber within the ferrule flange assembly has crimp zones that secure the optical fiber and improves stability and alignment with the opposing fiber optic connector endface.

Alternatively, the retainer nut may be replaced by a strain relief boot and a crimp ring as found in the prior art. The crimp ring is crimped about a backpost of a second extender cap. The second extender cap has a backpost without threads but a shaft grooved or recessed to accept the crimped or compressed portion of the ring. In this configuration, the ferrule flange assembly with crimp zones is deployed to hold the optical fiber within the bore of the ferrule flange assembly as descried herein.

BRIEF DESCRIPTION OF THE DRAWINGS

FIG. 8 is a cross section view of the FIG. 7 connector assembled;

FIG. 9A is a perspective view of another embodiment of a field installed fiber optic connector;

FIG. 9B is an exploded view of FIG. 9A;

FIGS. 15A-15G is a perspective view of assembling the connector of FIG. 4.

Corresponding reference numbers indicate corresponding parts throughout the figures.

DETAILED DESCRIPTION

The following terms shall have, for the purposes of this application, the respective meanings set forth below.

A connector is a device that completes a communication path from a fiber strand transmits a light signal to another connector or to transceiver electronics. The electronics convert the light signal into a digital signal. A connector is inserted and secured at either end of adapter, for example, a ferrule connector (FC), a fiber distributed data interface (FDDI) connector, an LC connector, a mechanical transfer (MT) connector, a standard connector (SC) connector, an SC duplex connector, or a straight tip (ST) connector. The connector may generally be defined by a connector housing body, an external latch or recess to secure said connector into adapter opening and one or more ferrules having optic fibers therein. In some embodiments, the housing body may incorporate any or all of the components described herein.

A receptacle is an adapter with internal structure to secure a proximal end or ferrule end of a connector within a port or opening. An adapter allows a first and second connector to interconnect or oppose each other to transmit a light signal from one part of a cable assembly to another, as an example. A receptacle may be a transceiver with an opening to receive a connector.

A "fiber optic cable" or an "optical cable" refers to a cable containing one or more optical fibers for conducting optical signals in beams of light. The optical fibers can be constructed from any suitable transparent material, including glass, fiberglass, polymer optical fiber, or plastic. The cable can include a jacket or sheathing material surrounding the optical fibers. Between the outer sheath and the optical fiber are strands of strength members or tensile members. In addition, the cable can be connected to a connector on one end or on both ends of the cable.

Figure 1:
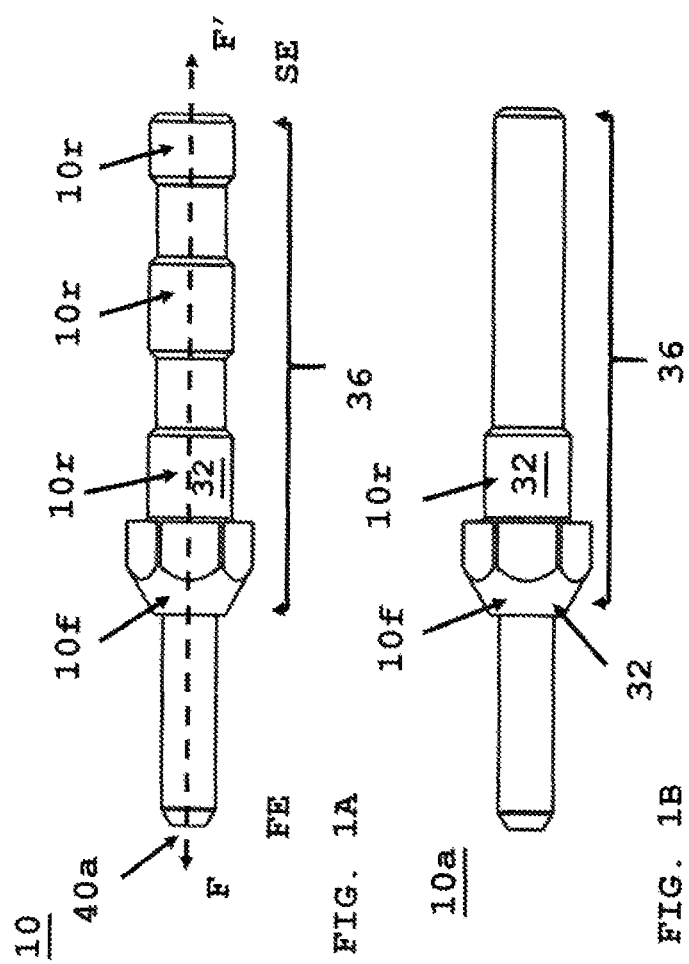
FIG. 1A is a ferrule flange assembly with crimp zones in the form of a rib.
FIG. 1B is perspective view of a second ferrule flange assembly.
Figure 2:
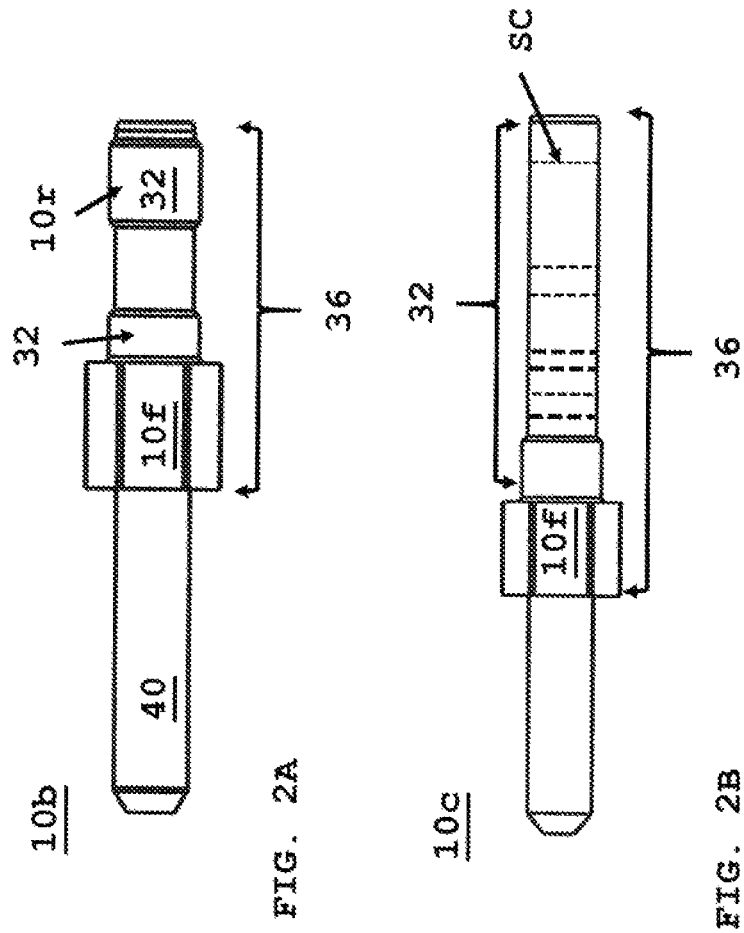
FIG. 2A is a perspective view of a third ferrule flange assembly.
FIG. 2B is a perspective view of a fourth ferrule flange assembly with multiple crimp zones.

FIG. 1A depicts a first embodiment of ferrule flange assembly (10). Ferrule (40) positions an optical fiber (20) at a ferrule endface (40a). The optical fiber is fed through a bore (F-F') within the ferrule flange assembly until the optical fiber extends beyond the ferrule endface (40a). The installer will cleave and then polish the exposed optical fiber thereby forming the ferrule endface (40a) that is opposite another fiber optic connector endface to establish a communication path for light to be transmitted from a first optical fiber to a second optical fiber in the second fiber optic connector. Assembly (10) has main body (36) with one or more crimp zones (32) (as described in FIG. 3) formed as rib (10r) from a first end (FE) to a second end (SE) of the assembly (10). FIG. 1B depicts a second embodiment of the ferrule flange assembly (10a) with rib (10r) and/or flange (10f) as the crimp zone (32). FIG. 2A depicts a third embodiment of ferrule flange assembly (10c) with an extended ferrule (40), and rib (10r) near the first end (FE) and the second end (SE). FIG. 2B depicts one or more crimp zone (32) spaced apart along main body (36). Along main body (36) is one or more radial scoring (SC) as illustrated by the dotted lines. So when a radial force is applied between two radial score lines (SC), the intermediate portion will collapse about the optical fiber therein. The crimp zones may be grouped together closely or spaced apart, and of varying radial size.

Figure 3:
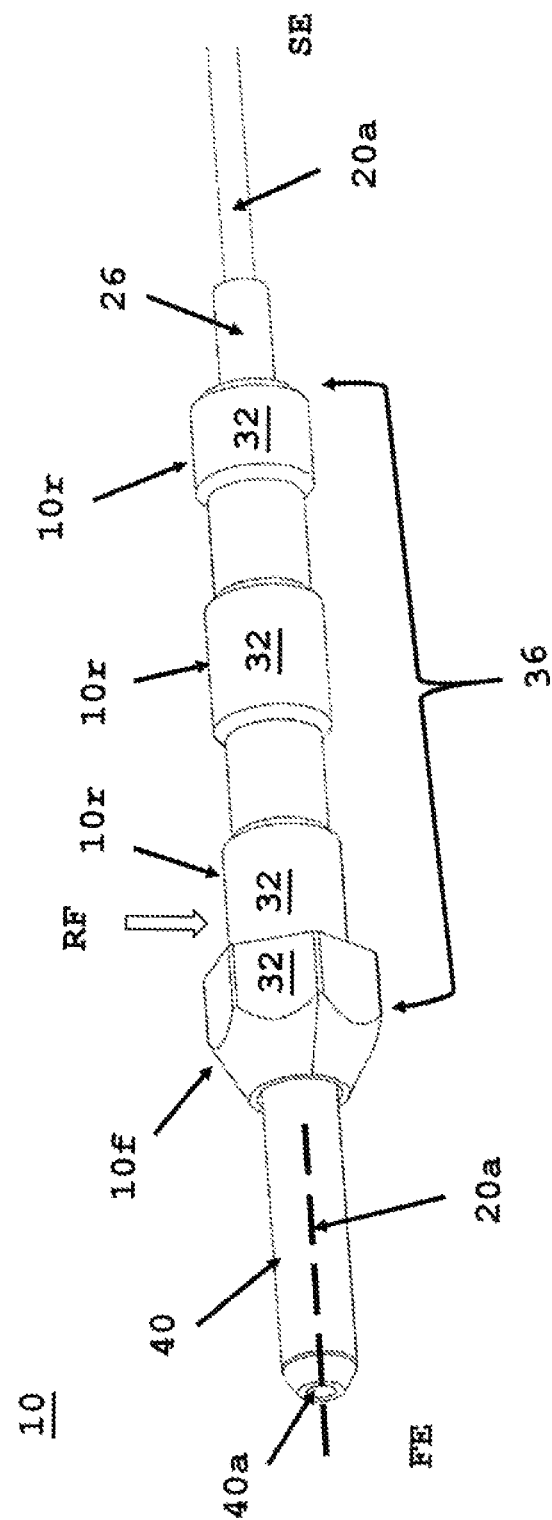
FIG. 3 is a perspective view of FIG. 1A with an optical fiber positioned with a bore of the ferrule flange assembly.

FIG. 3 depicts the embodiment of ferrule flange assembly (10) of FIG. 1A. At the first end (FE) is a ferrule (40) that may be configured with an optical fiber (20a). The ferrule flange assembly further comprises flange (10f) as part main body (36). Alternatively, an optical fiber may be inserted from the second end (SE) and inserted within bore (F-F') (refer to FIG. 1A) until the optical fiber is positioned at ferrule endface (40a). Along the ferrule flange assembly (10) comprises one or more crimp zone (32) positioned along main body (36) in addition to flange (10f) configured as a crimp zone. As described above in FIGS. 1A, 1B and FIGS. 2A, 2B, the crimp zone may vary. In FIG. 3, the crimp zone (32) are spaced apart rib (10r) that are collapsed about the optical fiber within the bore of the assembly when radial force (RF) is applied about the circumferential outer surface of a rib. The optical fiber may be a polymer optical fiber, or a coated glass fiber and a protective tube (26) may be placed about the optical fiber to which the rib (10r) would be collapsed upon. The tube can act as a spacer when an optical fiber or assembly bore is mismatched due to manufacturing tolerances, while installing in the field. Also, the tube (26) may help prevent mirco-cracking of an optical glass fiber when it is compressed under the radial force imparted to a rib or crimp zone. A polymer optical fiber can withstand surface micro-cracks as a polymer fiber cross-section is relatively homogenous or of the same light transmitting medium.

Figure 4:
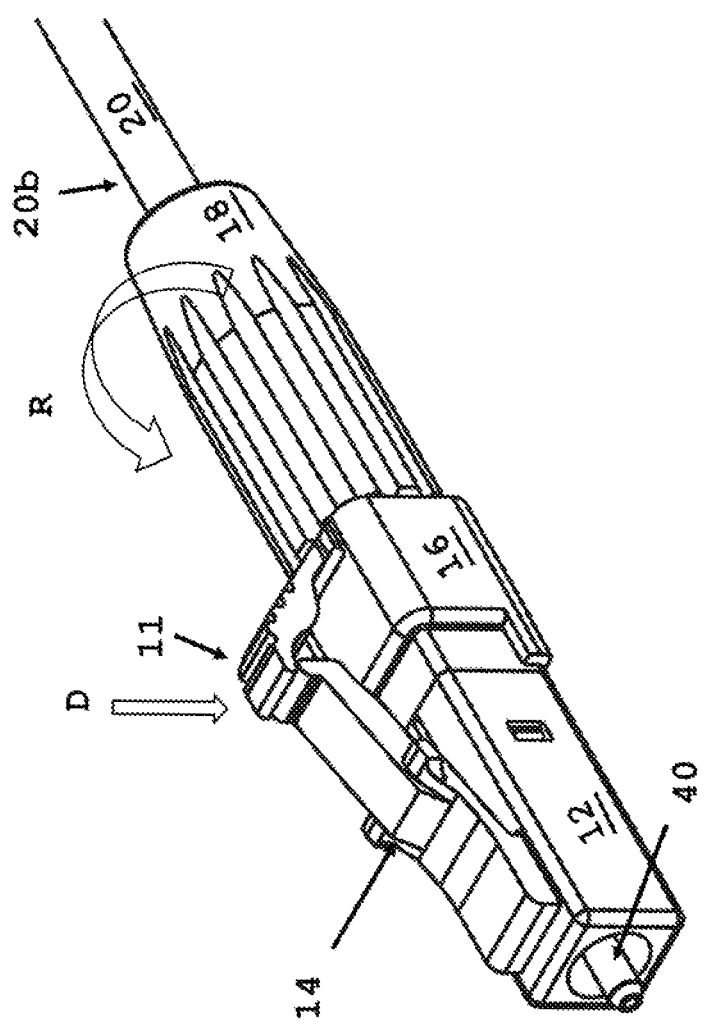
FIG. 4 is a perspective view of a field installed fiber optic connector.

FIG. 4 depicts an assembled field installable fiber optic connector (50) according to an embodiment of the present invention. Plug housing (12) secures the ferrule flange assembly (10) by capturing the flange (0f) within corresponding structure within the plug housing, such as a cut-out or recess configured to accept flange (10f). An extender cap (16) is secured to second end (SE) of the plug housing. Connection member (14) secures the connector within an adapter (not shown). The connection member is actuated by thumb release (11) that when depressed in direction of arrow "D" the connector (50) can be removed from an adapter port. Ferrule (40) protrudes from plug housing (12) when biased by spring (12d) (refer to FIG. 5). Retainer nut (1g) is threaded onto a threaded backpost of the extender cap forming connector (50). Optical cable (20) is secured to connector (50). The optical cable (20) further comprises optical fiber (20a), outer jacket (20b) and strength members (20s). Strength members (20s)(refer to FIG. 10) are strands of polyester or Kevlar.

Figure 5:
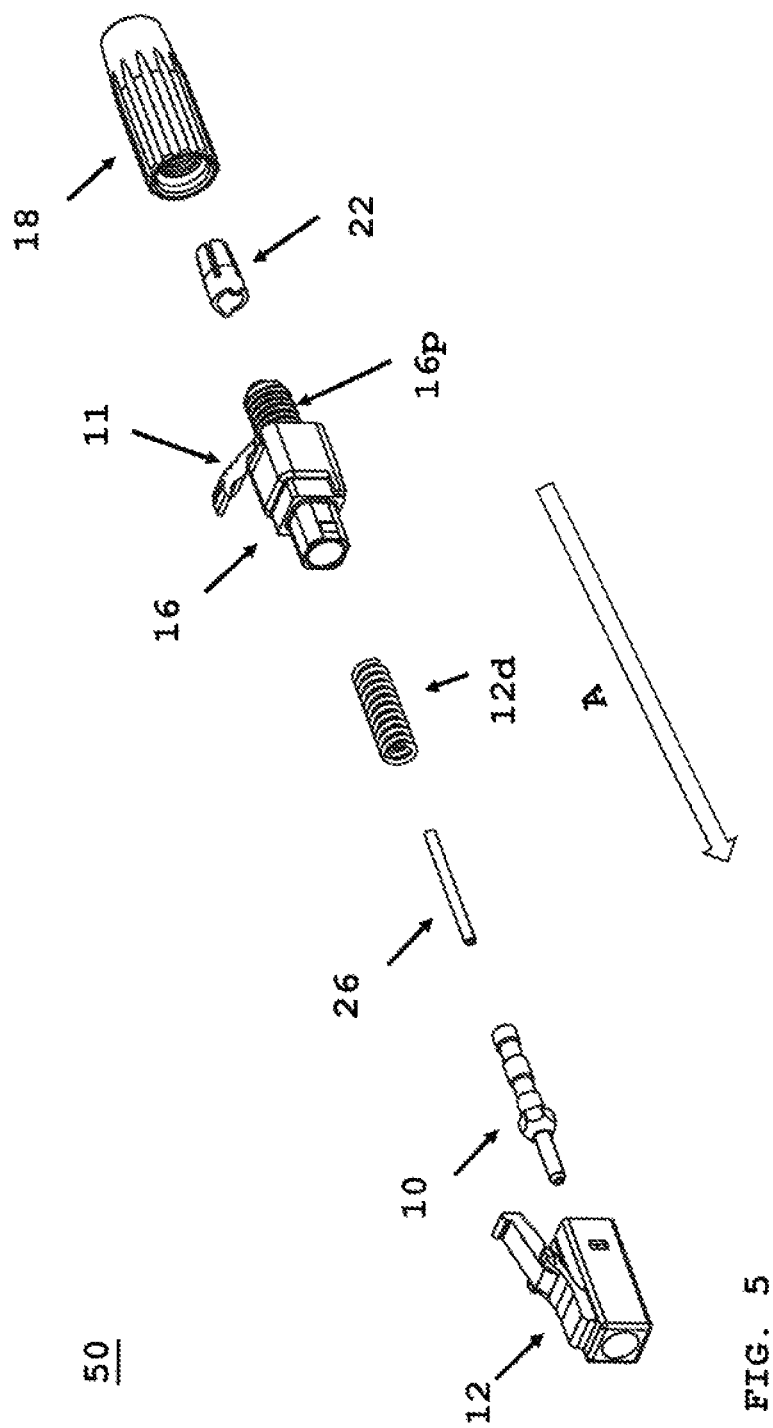
FIG. 5 is an exploded view of FIG. 4 deploying one of the ferrule flange assembly embodiments.

FIG. 5 is an exploded view of FIG. 4. Assembly generally occurs in direction of arrow (A). Plug frame housing (12) accepts ferrule flange assembly (10), and optional protective tube (26) is placed about an optical fiber (not shown). The plug frame housing is also called a connector housing. Bias spring (12d) is positioned distal or nearer flange (10f) to biases the ferrule forward when connector (50) is mated opposite a second connector within an adapter (not shown). Extender cap (16) with thumb release latch (11) is secured to a second end of housing (12). Retainer cap (22) with two or more wings is positioned at a second end or distal end of a threaded backpost of the extender cap, as described below. Retainer nut (18) is threaded onto the backpost to form the connector (50).

Figure 6:
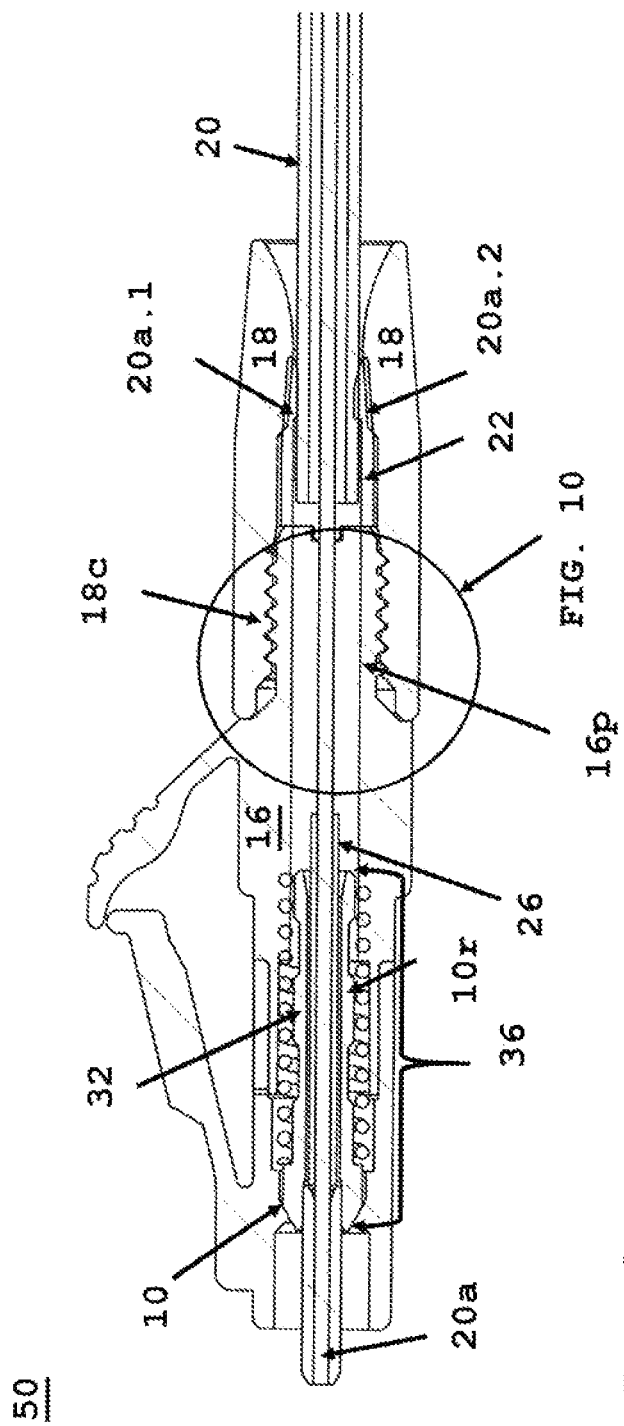
FIG. 6 is a cross-section view of FIG. 4.

FIG. 6 depicts a cross-section of assembled connector (50) of FIG. 4. Ferrule flange assembly (10) is secured within plug frame housing (12) with rib (10r) acting as crimp zone (32). There is more than one rib along main body (36) of ferrule flange assembly (10). Extender cap (16) has retainer nut (18) threaded (18c) with backpost threads (16p), and is further described in FIG. 10. Cable retainer (22) with frustoconical wing (20a.1, 20a.2, 20a.4) is compressed about optical cable (20) when retainer nut (18) is threaded onto backpost (16p) thereby improving pull strength of the fiber optic connector.

Figure 7:
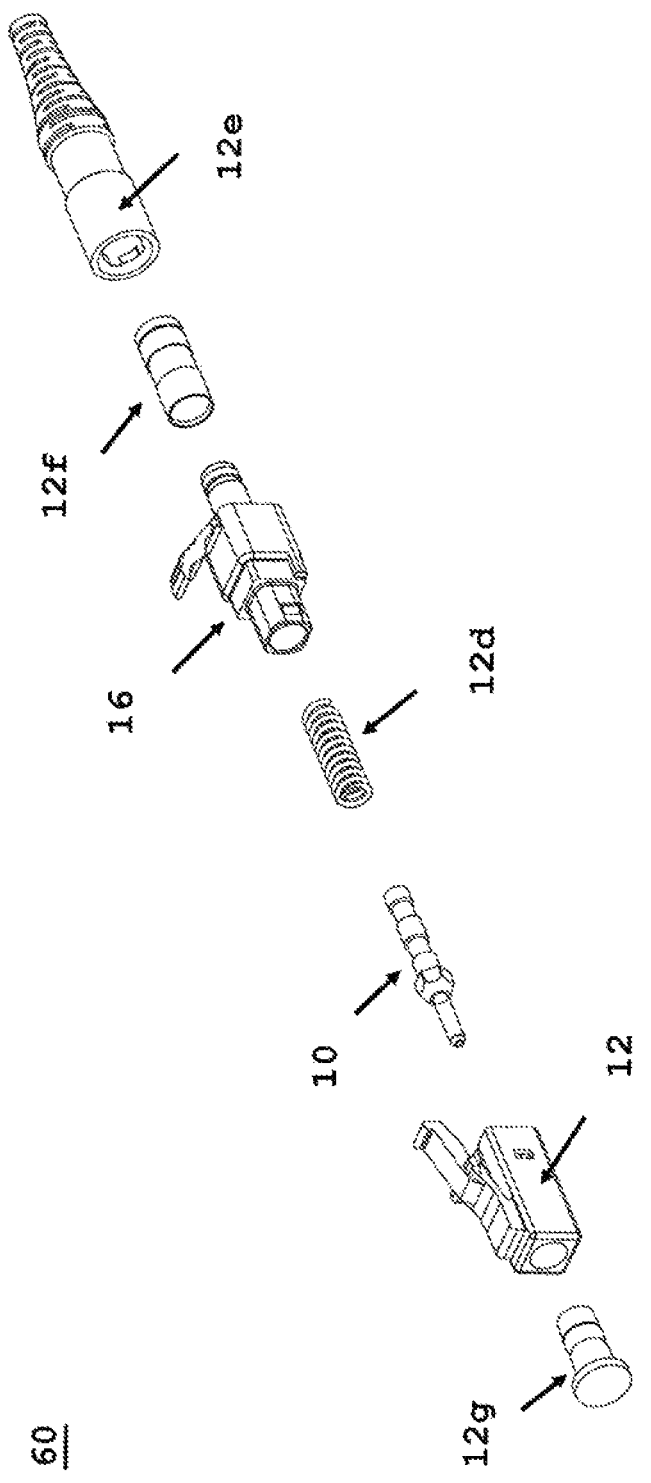
FIG. 7 is an exploded view of a second embodiment of a field installed connector.

FIG. 7 depicts an exploded view of another embodiment of a field installed fiber optic connector (60). Connector (60) deploys the prior art crimp ring (12f) that is secured to a backpost of extender cap (16), with strain relief boot (12e) placed over the backpost. Ferrule flange assembly (10) is secured within plug frame housing (12) and the assembly is biased forward by spring (12d). Extender cap (16) is secured at the second end of plug frame housing (12). Dust cap (12g) is positioned over the ferrule when assembled. FIG. 8 is a cross-section view of connector (60) assembled. Ferrule flange assembly (10) is secured within housing (12), with one or more crimp zone (32). The prior art crimp tube (12f) is crimped over the backpost at two crimp points (12f.1, 12f.2) to secure optical cable (20) to establish a pull strength. Crimp zone (32) are compressed about optical fiber (20a) that is positioned within the bore (F-F') of the assembly (10), thereby securing optical fiber (20a) against being pulled out when the cable is pulled away from the connector at the second end. Without departing from the scope of the present invention, ferrule flange assembly (10) may be replaced by other ferrule flange assembly (10a, 10b or 10c) in connector (50, 60 or 70).

Figure 9C:
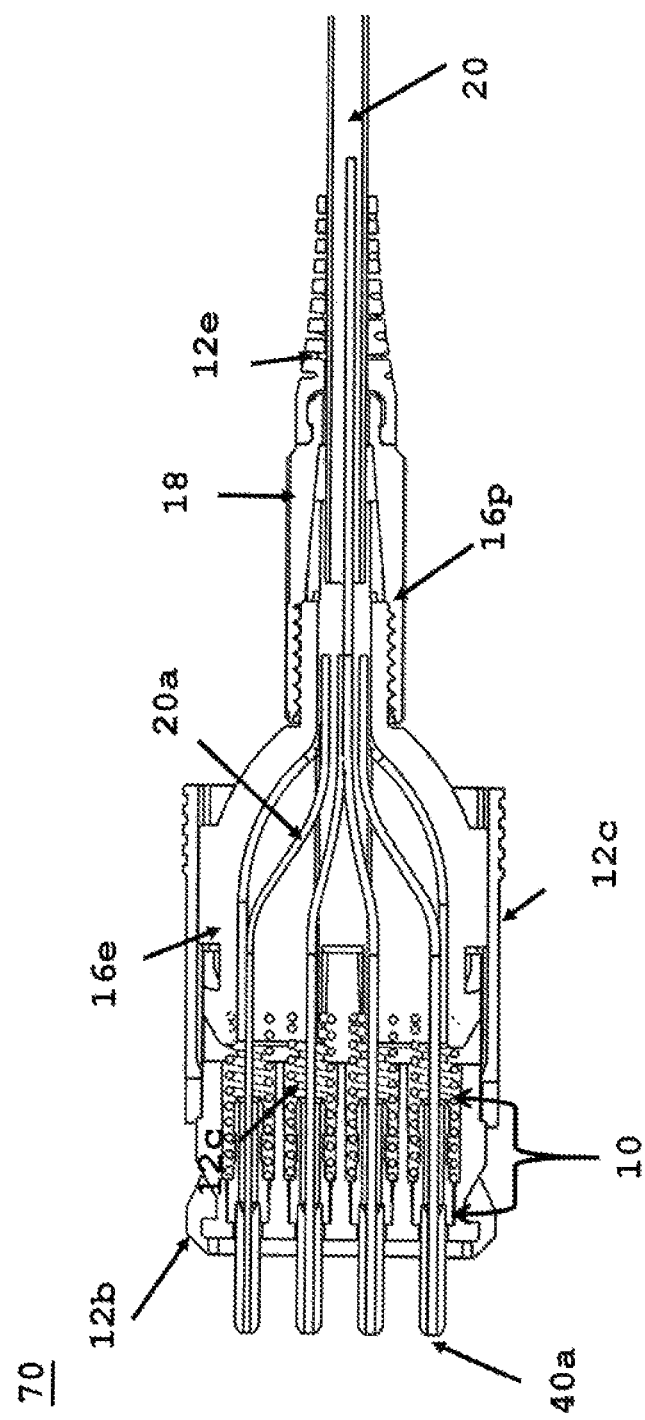
FIG. 9C is a cross-section view of FIG. 9A.

FIG. 9A is another embodiment of a field installable connector (70) assembled. FIG. 9B is an exploded view of connector (70). Connector (70), like connector (40) or connector (50), can deploy any one of the ferrule flange assembly (10, 10a, 10b or 10c) (refer to FIGS. 1A, 1B and FIGS. 2A, 2B). Connector (60) has a plurality of ferrule flange assembly (10) installed in the field as described above in FIG. 4. The group of ferrule flange assembly are housed in ferrule assembly subhousing (12c) that is secured within outer housing (12b). Subhousing (12c), ferrule flange assemblies (10), corresponding bias spring (12d) are secured together by rear housing (16e) along latch line (LL). Rear housing (16e) (refer to FIG. 9C) has a threaded backpost that can secure strength members (20s) between the threads of the backpost and inner threads of retainer nut (18). Backpost (16p) is threaded with a pair of wings (20a.1, 20a.2). A strain relief boot (12e) is attached to a second end of the rear housing (16e). FIG. 9C is a cross-section of the assembled connector (70). A plurality of ferrule flange assembly (10) are secured within subhousing (12c). Outer housing (12b) accepts backhousing (16e) and retainer nut (18) compresses wings (20a.1, 20a.2) about optical cable (20). Strength members (20s) are positioned between inner threads (18c) of retainer nut (18) and the backpost threads (16p). This increases optical cable pull strength. Wings (20a.1, 20a.2) are compressed about optical cable (20) when wings (20a.1) are compressed by retainer nut (18) when it is threaded onto the backpost. Back housing (16e) has a cavity that allows optical fibers to be positioned within and spaced apart without becoming entangled. Nearer a first end of the back housing, channels are formed to guide the optical fiber to the correct ferrule flange assembly (10).

Figure 10:
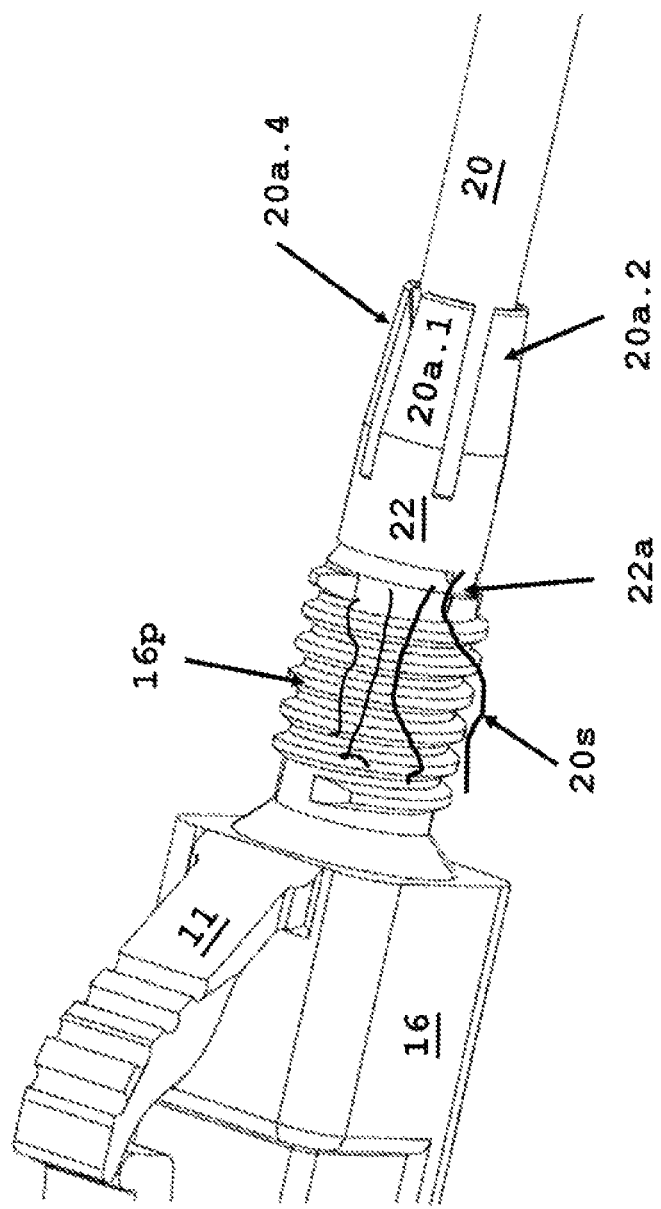
FIG. 10 is a zoomed view of the cable retainer section FIG. 6.
Figure 11:
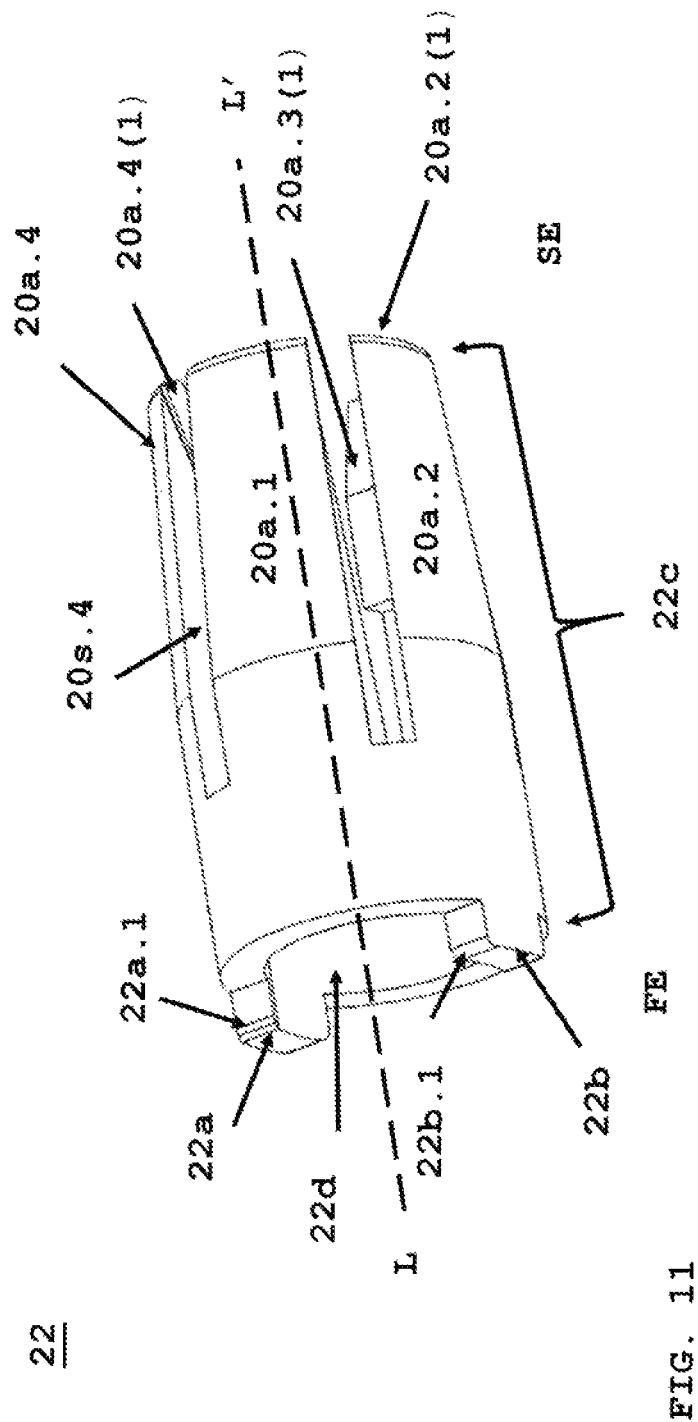
FIG. 11 is a perspective view of the cable retainer.
Figure 12:
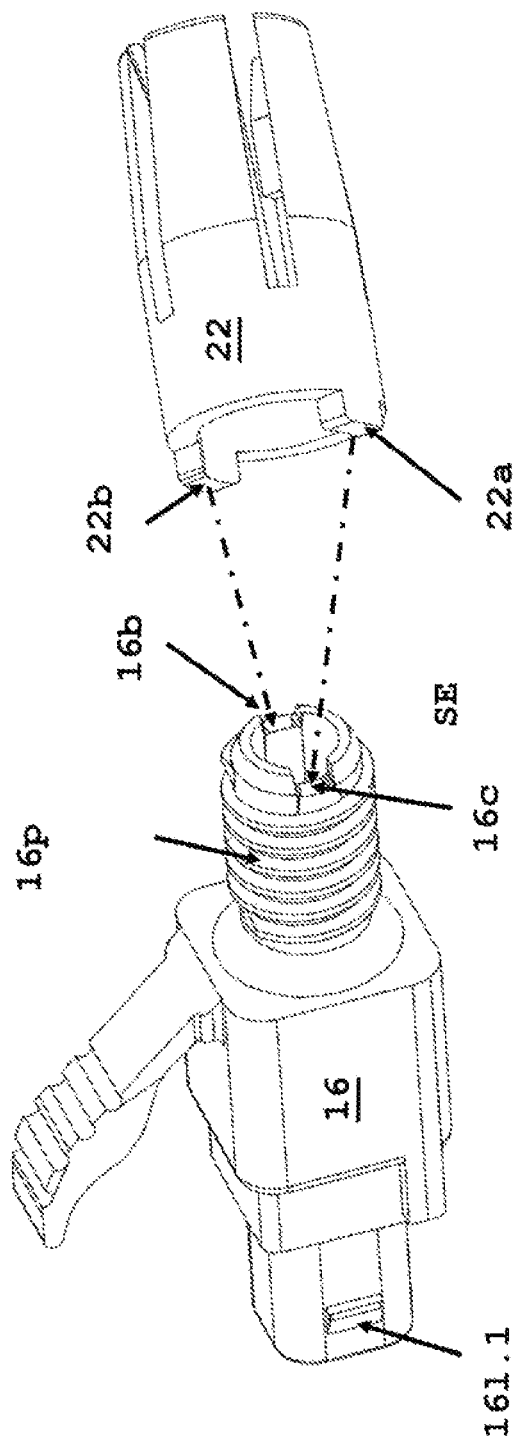
FIG. 12 is an exploded view of assembling the cable retainer to an extender cap.
Figure 13:
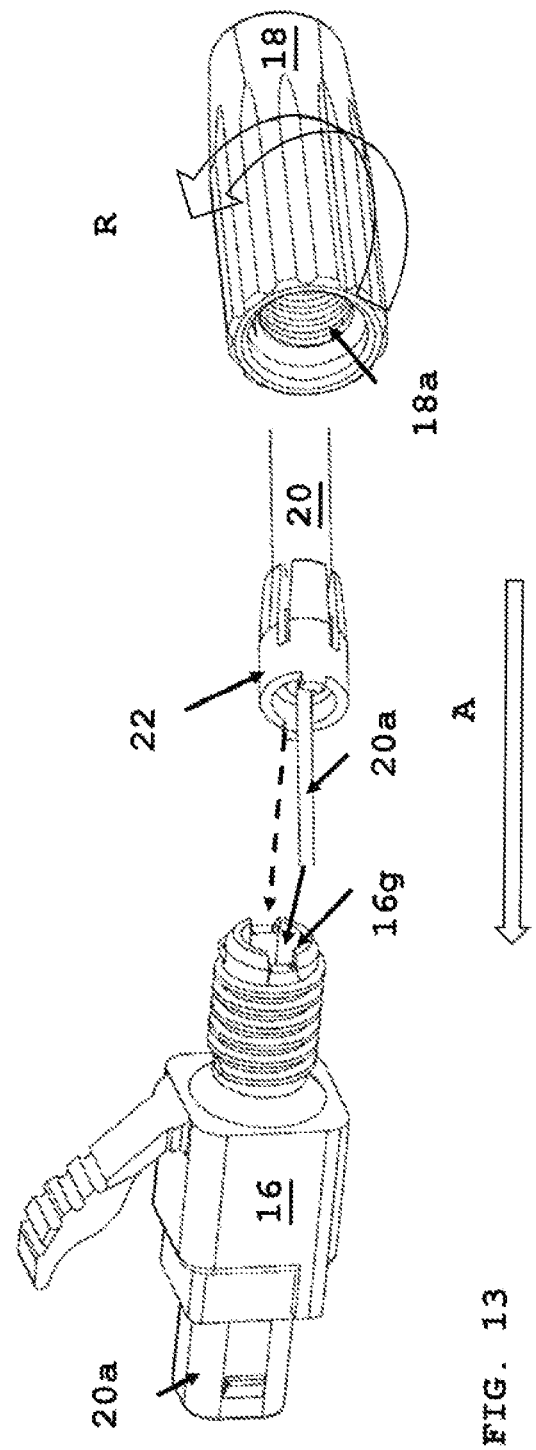
FIG. 13 is an exploded view of applying the retainer nut to the extender cap.

FIG. 10 depicts extender cap (16) with threaded backpost (16p) having strength members (20s) laid on or about backpost threads. Cable retainer (22) is positioned onto backpost with projection (22a) aligned with a recess of the backpost. At least two frustoconical wing (20a.1, 20a.2) with slot (20s.4) therebetween is formed at second end of the retainer (22). The slots allow the wings to come together or close the slot gap during compressing by retainer nut (18). Retainer (22) has a bore through which optical cable (20) is fed or positioned therein. FIG. 11 depicts cable retainer (22) with main body (22c) and bore (22d) along longitudinal axis (L-L'). At first end (FE) is at least one projection (22a, 22b) with chamfered edge or radius (22a.1, 22b.1). The chamfered edge helps guide the projection into receiver or recess (16b, 16c) located at a second end of the threaded backpost (16p). Each frustoconical wing (20a.1, 20a.2, 20a.4) has an inclined surface (20.2(1), 20a.3(1), 20a.4(1)). The inclined or tapered surface guides incoming optical cable (20) into the bore along (L-L') to help avoid jamming during a field installation of the cable with the connector. Referring to FIG. 12, at least one projection (22a, 22b) is received within corresponding recess (16b, 16c) to align and prevent rotation of cable retainer (22) when retainer nut (18) is being threaded onto backpost (16p). The wings (20a.1, 20a.2) are compressed about the optical cable helping to improve pull strength. Extender cap (16) latch (161.1) is received in a corresponding recess in a sidewall of the plug housing thereby securing extender cap (16) to a second end of the plug housing. FIG. 13 depicts optic cable (20) within cable retainer (22) and optical fiber (20a) extending through bore (16g) in extender cap (16) then through bore of ferrule flange assembly (10). Optical fiber (20a) will be inserted and secured by crimp zones as described above within ferrule flange assembly (10). Retainer nut (18) is screwed or twisted in direction of arrow (R) onto backpost (16p) where internal nut threads (18a) secure strength members (20s) therebetween. Assembly is in direction of arrow A.

Figure 14:
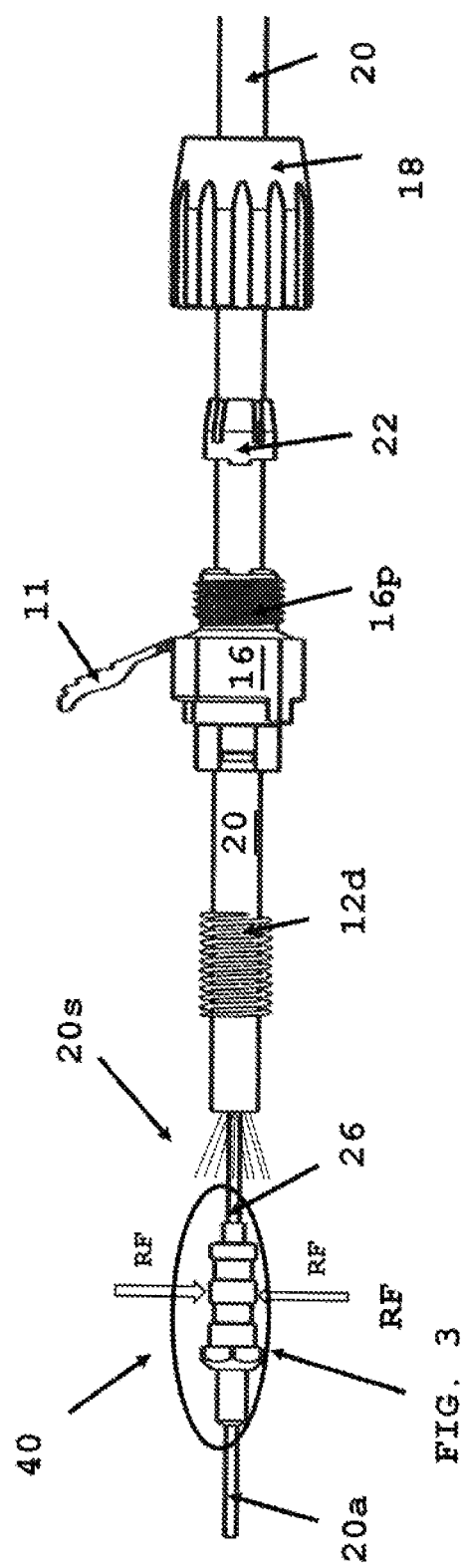
FIG. 14 is perspective view of separating the components of FIG. 3 and FIG. 4.

FIG. 14 illustrates the field installable fiber optic connector components separated along optical fiber (20a). Optical fiber (20a) would be cleaved and polished once pushed through the bore of ferrule (40) to form ferrule end face (40a). In this embodiment strength members (20s) may be pushed through the ferrule flange assembly bore and when the crimp zone has a radial force (RF) applied, the members (20s) are secured with optical fiber (20a) within the bore of ferrule flange assembly (10). Optical cable (20) is through the bore of the extender cap (16). Cable retainer (22) is to be positioned on backpost (16p) that receives threaded retainer nut (18) as described above.

Figure 15E:
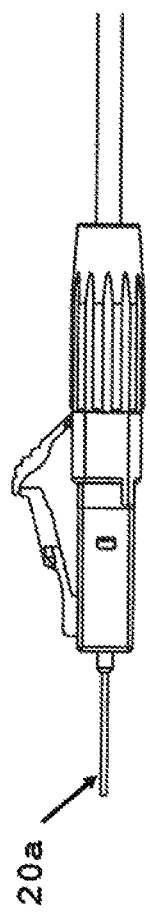
Figure 15F:
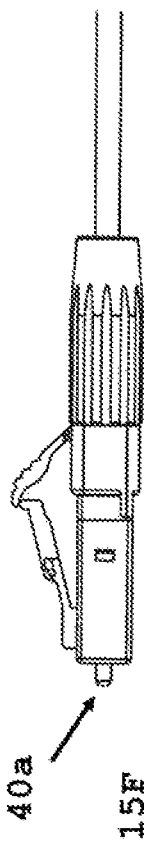
Figure 15G:
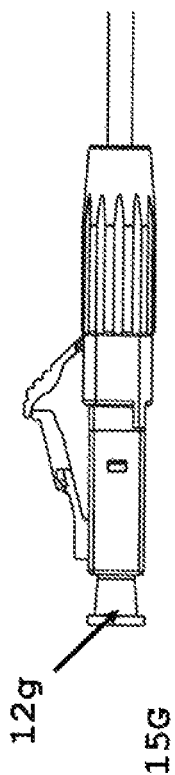

FIG. 15A to FIG. 15G depicts a method of field assembling a fiber optic connector deploying one of the ferrule flange assembly (10, 10a, 10b, or 10c). This assembly is similar between connectors (50, 60 or 70). FIG. 15A depicts optical fiber (20a) positioned through the bore of the extender cap (16) with bias spring (12d) positioned about cable (20). Cable retainer (22) is placed about optical cable (20) between extender cap (16) and retainer nut (18). FIG. 15B depicts the additional step adding optional protective tube (26), and then stripping back cable jacket (20b) (refer to FIG. 4) to expose one or more strength member (20s). FIG. 15C depicts securing ferrule flange assembly (10) by applying radial force (RF) about a crimp zone of ferrule flange assembly (10). This secures optical fiber (20a) within the bore of the ferrule flange assembly (10). The optical cable is pulled rearward placing ferrule flange assembly within plug housing (12). Plug housing is secured to the extender cap forming an intermediate connector assembly as depicted in FIG. 15D. Strength member (20s) is positioned about threaded backpost (16p). In FIG. 15E, retainer nut (18) is threaded onto backpost (16p) as shown in FIG. 13 in direction of arrow (R). FIG. 15F depicts fiber (20a) is cleaved and is polished to form a ferrule end face (40a). FIG. 15G depicts installing a dust cap (12g).

In the above detailed description, reference is made to the accompanying drawings, which form a part hereof. In the drawings, similar symbols typically identify similar components, unless context dictates otherwise. The illustrative embodiments described in the detailed description, drawings, and claims am not meant to be limiting.

With respect to the use of substantially any plural and/or singular terms herein, those having skill in the art can translate from the plural to the singular and/or from the singular to the plural as is appropriate to the context and/or application.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera).

The invention claimed is:

1. A ferrule flange assembly, comprising
a ferrule flange body with a longitudinal bore, the ferrule flange body having a first end and a second end spaced apart along a longitudinal axis;
a ferrule with an optical fiber is secured to the first end of the ferrule flange body;
a protective tube received in the longitudinal bore, the protective tube having a first end and a second end spaced apart along the longitudinal axis, the first end of the protective tube located adjacent the first end of the ferrule flange body and the second end of the protective tube located adjacent the second end of the ferrule flange body, wherein the protective tube is configured to receive an unjacketed portion of an optical fiber of an optical cable such that a first adjacent portion of the optical fiber protrudes longitudinally from the first end of the protective tube and is received in the ferrule and a second adjacent portion of the optical fiber protrudes from the second end of the protective tube;
wherein the ferrule flange body includes a crimp zone positioned along the ferrule flange body; and wherein
wherein the crimp zone is collapsed onto the protective tube about the optical fiber when a radial force is applied to the crimp zone.

2. The ferrule flange assembly of claim 1, wherein the optical fiber is inserted within a bore of the ferrule at a second end until the optical fiber is flush with a ferrule endface at a first end.

3. The ferrule flange assembly according to claim 1, wherein the optical fiber is a polymer optic fiber or a glass optical fiber.

4. A field installable fiber optic connector, comprising:
a plug frame housing comprises a ferrule flange assembly with a crimp zone and a ferrule; and wherein
the crimp zone is compressed directly onto an unjacketed portion of an optical fiber terminated by the ferrule.

5. The field installable fiber optic connector according to claim 4, wherein a plug housing is configured to secure an extender cap.

6. The field installable fiber optic connector according to claim 5, wherein the optical cable further comprises a polymer optic fiber.

7. The field installable fiber optic connector to claim 6, wherein a spacer is positioned about the optical fiber when the optical fiber diameter is less than a bore size of the ferrule flange assembly.

8. A cable retainer, comprising:
a main body having:
a first end further comprising one or more projections, each of the one or more projections configured to be received in a corresponding notch on a backpost, whereby the one or more projections circumferentially align the cable retainer with the backpost; and
a second end has at least two spaced apart tapered, frustoconical wings;
wherein the wings are separated by a slot; and wherein the wings are configured such that compressing the wings secures an optical cable within a longitudinal bore of the main body.

9. The cable retainer according to claim 8, wherein each wing has an inclined surface to guide the optical cable through the longitudinal bore.

10. The cable retainer according to claim 8, wherein the projection further comprises a chamfered leading edge.

11. The cable retainer according to claim 8, wherein the optical cable is a polymer optical fiber.

* * * * *